United States Patent Office 3,079,223
Patented Feb. 26, 1963

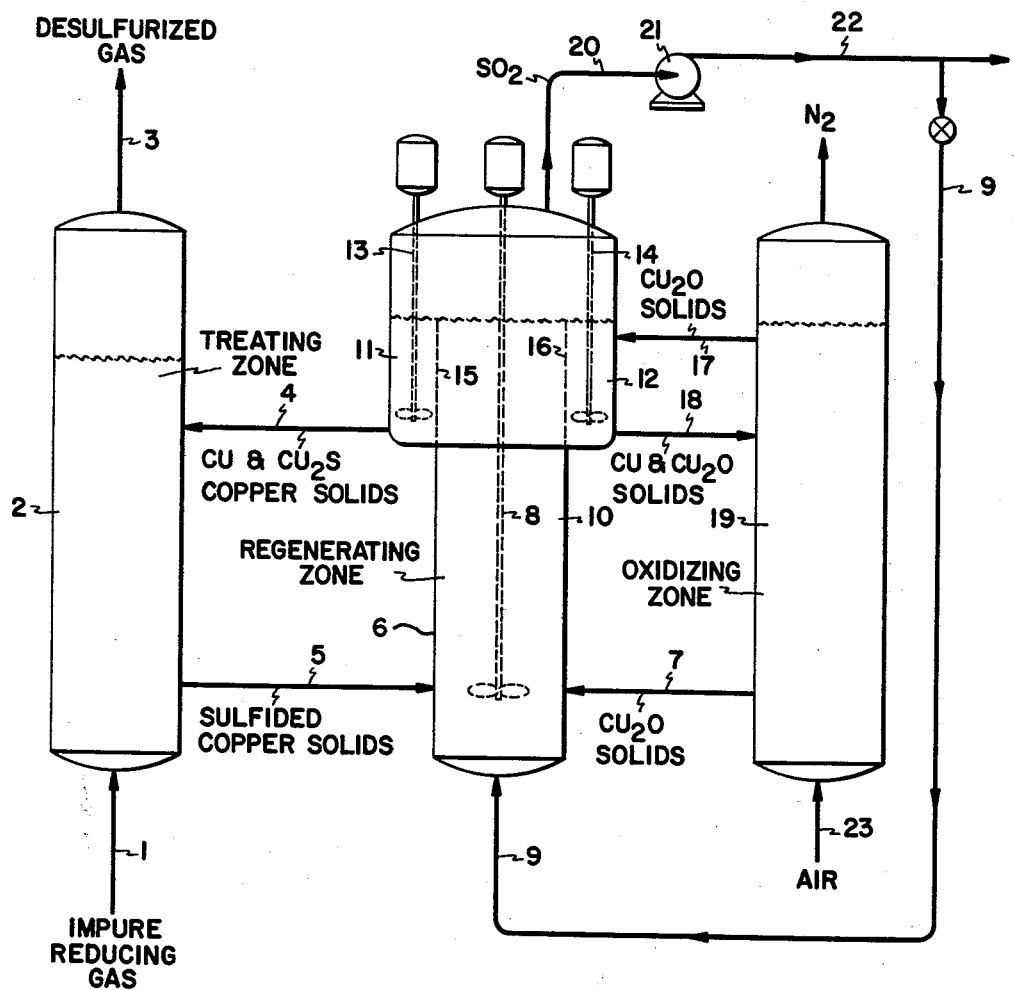

3,079,223
DESULFURIZING REDUCING GASES
Warren K. Lewis, Newton, Mass., assignor to Esso Research and Engineering Company, a corporation of Delaware
Filed Aug. 5, 1960, Ser. No. 47,774
7 Claims. (Cl. 23—3)

This invention relates to a process for desulfurizing reducing gases such as coke oven gas, producer gas, water gas, hydrocarbon gases, and gases synthesized from petroleum oils or from hydrocarbon gases using fluidized copper-bearing solids and using steps for producing a high quality sulfur dioxide gas product in regenerating the copper-bearing solids.

This application is a continuation-in-part of Serial No. 806,573, filed April 15, 1959, and now abandoned, which shows some of the techniques involved in the present invention.

While there have been methods proposed to use elementary copper for desulfurizing reducing gases, they have not been satisfactory with regard to controls for preventing recontamination of reducing gases, with regard to controls for continuous uniform removal of sulfur compounds, or for segregating the sulfur as a useful $SO_2$ product and for preventing air pollution.

As shown in U.S. patent application 806,573, a stream of industrial fuel gas or reducing gas can be desulfurized continuously and uniformly if passed through a bed of copper-bearing solids fluidized by the gas while the solids provide sufficient metallic copper contact surface and the temperature of the bed is properly maintained. As metallic copper in the solids becomes partly sulfided to $Cu_2S$ and thus becomes spent, such solids are continuously withdrawn from the bed and replaced by regenerated copper solids continuously added to the bed, to maintain a constantly adequate proportion of Cu or metallic copper therein. The metallic copper of the solids decomposes hydrogen sulfide in the gases treated to form hydrogen, which becomes admixed with the gas treated, and to form $Cu_2S$. Thus the gas treated becomes enriched in hydrogen and freed of hydrogen sulfide if in the treating zone there is sufficient metallic copper continuously present without excessive build-up of $Cu_2S$, if a proper temperature is maintained in the treating zone, and if the treating zone is kept substantially free of oxidizing substances such as copper oxides ($Cu_2O$ or $CuO$).

It is highly desirable to keep the copper oxides in the treating zone at a minimum, e.g. less than 1% based on the total free and combined copper, to avoid oxidizing components of the gas stream being treated, e.g. $H_2$ and CO, and to avoid adding $SO_2$ to the gas stream.

The treated gases freed of hydrogen sulfide to the extent desired and enriched by the hydrogen are separated from the bed of solids and withdrawn from the treating zone.

The spent copper-bearing solids separated from the treated or desulfurized gas and withdrawn from the bed in the desulfurization treating zone are passed to a regeneration zone. According to a method described in Ser. No. 806,573 metallic copper in the solids is regenerated mostly by controlled oxidation of the $Cu_2S$ with oxygen-containing gas or oxygen from air. To obtain the controlled oxidation, the partly sulfided copper solids are added at a controlled rate to a bed of fluidized solids containing the copper mostly as elementary copper. The oxygen supplied to the fluidized bed of solids in the regeneration zone is proportioned to oxidize partly the $Cu_2S$ and to leave part of the $Cu_2S$ unoxidized so that it can undergo reaction with a limited amount of $Cu_2O$ that is formed. To meet this requirement, the spent copper-solids ($Cu+Cu_2S$) are continuously added to the bed of fluidized solids in the regeneration zone where intimate mixing of the solids and of the oxygen-containing gas or air proportioned to oxidize the desired $Cu_2S$ is obtained. This oxidation of part of the $Cu_2S$ to Cu without excessive formation of copper oxides proceeds satisfactorily, particularly under conditions which will be given in further detail. However, to obtain as much elimination of $Cu_2O$ or copper oxides from the solids as practical, the solids containing mostly metallic copper with some $Cu_2O$ formed by the oxidation are passed to a heat soaking zone where residual $Cu_2S$ is reacted with the remaining $Cu_2O$ or admixed $Cu_2O$. In the heat soaking, an adequate amount of $Cu_2S$ has to be present to insure a practically complete reaction of the $Cu_2O$ under conditions for eliminating resulting $SO_2$ gas that is formed. Thus, the regenerated solids in the heat soaking zone and which are passed to the desulfurization treating zone will contain mostly elementary copper with an appreciable amount of $Cu_2S$, e.g. 1 to 10% of total free and combined copper. By effective regeneration including soaking, the amount of $Cu_2O$ in the regenerated solids is made negligible.

The present invention provides advantageous modifications for a continuous process in which an industrial fuel gas or reducing gas stream is treated at a continuous uniform rate by Cu solids circulated through the treating zone, wherein the metallic copper of the solids reacts with $H_2S$ in the gas to become partially sulfided to $Cu_2S$ and form $H_2$ as the treating zone is maintained substantially free of copper oxides, which would oxidize the $H_2$ to $H_2O$. In a modified regeneration, to obtain the desired removal of sulfur from the $Cu_2S$ as a high purity $SO_2$ stream, the partially sulfided Cu solids are continuously withdrawn as spent solids from the treating zone and are intimately mixed with a suitable proportion of $Cu_2O$ in the Cu regeneration zone. The $Cu_2O$ is formed by oxidation of part of the Cu using air in an oxidizing zone which produces a $N_2$ gas stream practically free of sulfur compounds so that this stream can be released without causing air pollution or used for other purposes where the inert gas has to be free of sulfur contaminants.

It will be noted that an important feature of the modified regeneration resides in the technique of oxidizing the $Cu_2S$ to Cu by $Cu_2O$ and not directly by oxygen gas. The $Cu_2O$ is formed by oxidizing Cu with oxygen-containing gas in the absence of $Cu_2S$ or with a minimum of $Cu_2S$ present.

More details of the process will be explained with reference to the flow diagram shown in the drawing.

As shown in the flow diagram, a stream of reducing gas or of fuel gas to be desulfurized is introduced from line 1 into desulfurization treating vessel 1 for contact with copper-bearing solids which react with $H_2S$ in the impure gas to form $Cu_2S$ at a temperature in the range of about 300° to 1000° C. The purified gas leaves vessel 2 by line 3. The copper-bearing solids enter vessel 2 from line 4. The partially-sulfided copper-solids (Cu and $Cu_2S$) are withdrawn from vessel 2 and transferred by line 5 to a regenerating vessel 6 wherein oxygen for reaction with the $Cu_2S$ is supplied by $Cu_2O$.

The $Cu_2S$-containing solids from line 5 are intimately mixed with $Cu_2O$-containing solids from line 7, in a proportion of nearly 2 mols $Cu_2O$ to 1 mol $Cu_2S$ and preferably a small excess $Cu_2S$ for obtaining the following reaction:

$$Cu_2S + 2Cu_2O \rightarrow 6Cu + SO_2 + Cu_2S \quad \text{(Excess } Cu_2S\text{)}$$

The intimate mixing can be obtained by mechanical means represented by a stirrer 8, by fluidization with $SO_2$ gas, such as recycled $SO_2$ effluent from vessel 6 from line 9 or both, or any other suitable means.

The regenerated Cu solids, comprising mostly Cu with a minor amount of $Cu_2S$ and some $Cu_2O$, are made to flow from the main body of solids 10 in vessel 6 into two separate adjoining zones for additional soaking in side compartments 11 and 12. Each of these compartments may be equipped with a stirring means 13 and 14 within their respective enclosures 15 and 16, and gas stripping means for the solids flowing into or in lines 4 and 18.

In compartment 11, a portion of the regenerated solids entering from the main body is soaked to obtain practicaly complete reaction of any $Cu_2O$ or copper oxides. The solids finally withdrawn from compartment 11 for transfer by line 4 to vessel 2 may contain a relatively small amount of $Cu_2S$ with the regenerated Cu.

In compartment 12, a portion of regenerated solids from main body 10 is given an opportunity for reaction with added $Cu_2O$ from line 17, making the $Cu_2O$ enough in excess of $Cu_2S$ present to ensure that the solids drawn off from compartment 12 by line 18 for transfer into the vessel 19 are practically free of $Cu_2S$.

With the operation of vessel 6 and its adjoining zones, the $SO_2$ gas effluent withdrawn by line 20 is kept at high purity, close to 100%. This gas may be drawn through a pump or compressor 21 and then passed through line 22 to any unit where the $SO_2$ gas is to be used. A portion of the $SO_2$ gas may be recycled by line 9 to vessel 6 as a fluidizing gas.

In vessel 19, air or oxygen-containing gas introduced by line 23 is reacted with Cu to form $Cu_2O$ that is returned by line 7 for the reaction with $Cu_2S$ and by line 17 to compartment 12 for completing the decomposition of residual $Cu_2S$, as explained. The main body of solids in vessel 19 consists essentially of Cu and $Cu_2O$. To obtain this, one mol of $O_2$ is reacted with four atoms of Cu in well mixed solids in accordance with the reaction:

$$4Cu + O_2 \rightarrow 2Cu_2O$$

The amount of $Cu_2O$ formed in vessel 19 is dependent on the needs in vessel 6 and zone 12. By controlled operation of vessel 19 with air from line 23, the gas effluent withdrawn from vessel 19 by line 24 can be about 99% $N_2$. Good mixing and correct proportioning of oxygen are highly important in operating vessel 19. However, if $O_2$ in the off gas is allowable, excess air in 19 is advantageous.

Various means for assuring and controlling flow of materials, pressures, temperatures, heating and cooling may be used.

The copper solids are preferably in the form of fluidizable particles of 0.01 to 1.0 millimeter size, suitable for fluidization by gases treated in the desulfurization zone and gas used in the regeneration steps. Finely divided copper metal may be compressed with binders or be used on carriers. The binder or carrier material may be an inorganic refractory material, e.g. silica gel, magnesia gel, alumina gel, mixed gels, clays or the like. The copper metal may be 2 to 45 wt. percent, preferably 2 to 20 wt. percent in the particles based on the carrier.

For the desulfurization, a reducing gas stream containing $H_2S$ contacted at about 300° to 1000° C., preferably 375° to 600° C. in one or more stages with the copper solids that are supplied at a rate to permit partial sulfiding to $Cu_2S$ where the gas treated then becomes disengaged from the solids. The temperature is maintained at lower temperatures and the contact time is decreased to minimize cracking of hydrocarbons if they are present and according to the ability of the hydrocarbons to resist cracking.

By adjusting the velocity of the gases to characteristics of the solids, these solids are maintained in the form of a fluidized solids bed or suspended in the gases for the time of treatment. The treated gases containing the $H_2$ from the converted $H_2S$ are separated from the partially sulfided copper-solids (Cu mixed with $Cu_2S$) using known methods, e.g., cyclone separators, for removing suspended solids from the treated gases which are enriched in $H_2$ and given the desired decrease in $H_2S$ content.

The desulfurization with copper-solids can be applied to various industrial fuel or reducing gases, e.g., primary or secondary gases, which contain $H_2$, CO, and gaseous hydrocarbons, and is particularly useful for treating high temperature reducing gases which are to be kept hot in flowing from a gas generator to the unit in which they are used, e.g. for reducing metal oxides, hydroforming, hydrofining or other reaction zones in which the gases are to be used.

The presence of $CO_2$ in a gas to be desulfurized is adverse but is counteracted by the presence of hydrogen. On the other hand, if the hydrogen content of the gas is high, there is a tendency of the hydrogen to form $H_2S$ by the reverse reaction and thus lower absorption of sulfur by the copper solids. This latter effect depends on the equilibrium of $H_2$ and $H_2S$ at a given temperature. By decreasing the temperature of sulfur removal this reverse reaction can be counteracted. The reversible reaction is represented as follows:

$$H_2S + 2Cu = Cu_2S + H_2$$

Although some desulfurization takes place at about 300° C. and even below, the rate becomes faster and more practical at higher temperatures, e.g. 350° to 600° C. and above. To obtain the fast rate of desulfurization to the equilibrium level, some of the copper in the solids should remain uncombined with sulfur. At the higher treating temperatures of about 750° to 1000° C., rapid desulfurization is obtained but more $H_2S$ is left in the gas at equilibrium which is related to temperatures as follows:

| Temperature, °C.: | Mols $H_2S/10^4$ mols $H_2$ |
|---|---|
| 342 | 0.26 |
| 492 | 0.91 |
| 572 | 2.88 |
| 637 | 4.61 |
| 720 | 7.17 |
| 831 | 11.7 |
| 1036 | 22.1 |

Thus is shown that the amount of $H_2S$ in the treated gas at equilibrium is lowered as the $H_2$ concentration or partial pressure is lowered. The equilibrium ratio $p\ H_2S/p\ H_2$ is not affected by the proprtion of $Cu_2S/Cu$ present in the solids, but the rate of reaction of the $H_2S$ with Cu is proportional to the effective Cu surface independently of the amount of $Cu_2S$. Accordingly, the treating temperature and flow of solids supplying Cu surface and removal of spent solids are selected for the desired rate of conversion of Cu to $Cu_2S$.

Advantage can be taken of the equilibrium and rate relationships pointed out to have the feed gas to be desulfurized first treated for a short contact time at a relatively high temperature with partially sulfided copper-solids in an initial contact zone and then treated in a subsequent zone at a lower temperature, e.g. 350° to 600° C. with solids presenting more Cu surface. The higher Cu surface solids can thus remove more sulfur in said subsequent zone from which the partly sulfided solids pass into the zone where the raw gas is treated at a higher temperature, if desired.

The regeneration of Cu in the solids from $Cu_2S$ formed in the desulfurization treating zone involves more complex problems for preventing copper oxides from entering the treating zone, for preventing formation of undesired oxy-sulfides or sulfates of Cu, and for preventing over-oxidation of the copper that give undesired changes in concentration of copper oxides.

The regeneration of the Cu by reacting $Cu_2S$ directly with $O_2$ of air can be carried out with certain controls of conditions and steps to reconvert any copper oxides formed to Cu, e.g. a soaking step in which the solids are mainly Cu with some excess $Cu_2S$ to react with the copper oxides. However, the further improved procedure herein described converts the $Cu_2S$ to Cu by reaction with $Cu_2O$ without supplying air or gaseous oxygen to the zone.

In the direct oxidation of $Cu_2S$ with air to form Cu and $SO_2$, Cu present can react with the $SO_2$ to form $Cu_2S$ and $Cu_2O$. At each temperature this reaction has a definite equilibrium pressure of $SO_2$, above which $SO_2$ is absorbed by or reacts with the Cu. At 1 atmosphere, for example, 1 mol of air supplies 0.21 mol $O_2$ which reacts to form 0.21 mol $SO_2$ making the $SO_2$ partial pressure 160 mm. which is the equilibrium pressure of $SO_2$ at 627° C. Therefore, at 627° C. or above and one atmosphere the direct air regeneration reaction for removal of $SO_2$ is feasible, but at a lower temperature the $O_2$ oxidizes the Cu and permits only a limited amount of $SO_2$ to escape with the $N_2$. Nevertheless it is sometimes desirable to regenerate at lower temperatures to keep the copper solids in better condition and steps can be taken to use lower temperatures.

For example, assume it is desired to regenerate directly with air at a lower temperature, e.g. 587° C., at which the $SO_2$ equilibrium pressure is 115 mm. or 0.15 atm., the following techniques can be used:

(a) Operate under vacuum or reduced pressure so that the partial pressures of $O_2$ and $SO_2$ are lowered in proportion to the total pressure.

(b) Dilute the gas phase with nitrogen, or inert gas, which can be separated for this use if the regeneration gas product ($SO_2$ and $N_2$) is washed with water, milk of lime, or with aqueous soda, or is used in a sulfuric acid plant.

(c) Operate in a zone where the mol ratio of $Cu_2S$ to $Cu_2O$ is kept above 1:2 as S of the sulfide is removed and providing a soaking stage in which lowered pressure and/or inert diluent help to remove the $SO_2$ as the final amounts of $Cu_2O$ are converted to Cu with some $Cu_2S$ remaining.

The technique of (c) is adapted to a regeneration in which $Cu_2O$ is formed in a separate zone, e.g. vessel 19, then is supplied at a correct rate into admixture with $Cu_2S$ in another zone, e.g. vessel 6 where no $O_2$ or air is used, and with further mixing in an additional zone, e.g. compartment 11, where final trace amounts of $Cu_2O$ are reacted with residual $Cu_2S$ and the $SO_2$ evacuated or removed as it is formed.

In the partial oxidation of Cu by $O_2$ of air carried out in vessel 19, the air rate and the rate of passing the mixture of Cu and $Cu_2O$ as by line 18, is controlled to supply the required approximate 2 mols of $Cu_2O$ per mol $Cu_2S$ that is to be reacted in vessel 6. The oxidation of Cu to $Cu_2O$ takes place quickly at temperatures in the range of 400 to 600° C. or higher with air fluidizing the Cu and $Cu_2O$ solids in vessel 19. Similar temperatures can be maintained in vessel 6. Pressure in vessels 6, 11 and 12 must be low enough to evolve $SO_2$ from $Cu_2S$—$Cu_2O$ mixtures at temperature used.

The process will be described further in the following procedures and examples.

To prepare a suitable copper-solids treating agent, silica gel is impregnated with aqueous copper nitrate solution, is dried, then roasted in air at temperatures of 160° C. to 450° C. or higher, if desired. The silica gel carrier may be crushed or ground to the desired size before the impregnation to adjust the size of the particles, e.g., from 100 to 200 mesh and some finer. The copper oxide impregnated carrier may then be subjected to a reduction, e.g., 1 hour contact with hydrogen at 150° to 200° C. Similarly, other carriers may be impregnated to contain from 2 to 45 parts by weight of copper and preferably about 2 to 20 parts by weight of copper per 100 parts by weight of carrier.

The impregnated carriers have suitable fluidization characteristics in gas velocities of 0.5 to 5 feet per second. At elevated temperatures of 600° C. and higher, adjustments can be made varying the particle size. A fresh charge of the copper oxide impregnated carrier may be reduced at the start in the treating zone with the hydrogen.

In the following example is a description of how the desulfurization at elevated temperatures is demonstrated.

*Example 1*

Using hydrogen containing 900 grains $H_2S$/100 cubic feet (STP), making the concentration about 1.5% by volume $H_2S$, a gas stream thereof was passed into contact with copper impregnated silica gel containing more than 2 wt. percent Cu at rates ranging upward from 3 cubic feet of gas at standard temperature and pressure (STP) per minute per pound Cu in the bed.

In a series of determinations for reaction rates as a function of temperature, runs were made at increasing temperature levels, starting at 350° C. The percent $H_2S$ removed was determined at each temperature level. At temperatures above 400° C. the $H_2S$ was decomposed by sulfiding the copper and liberating hydrogen to an extent that the treated gas had low levels of .01 to .02% $H_2S$, the entering contaminating gas having 1 to 1.5% $H_2S$ by volume. Under optimum temperatures in the range of 350° to 600° C. the decomposition of the $H_2S$ for its removal from the gas was approximately 98.5%. At higher temperatures in the range of 600° to 925° C., the removal of $H_2S$ in this manner was found to be in the range of 80 to 95%.

At temperatures above 400° C. with continuous flow of solids through the treating zone, space velocities permitted increase rapidly above 500 volumes of gas treated per volume copper-solids per hour.

In the desulfurization, the contacting rate that counts depends on the amount of elementary copper and not on the amount of carrier. Although as much as 45 wt. percent Cu on carrier could be used, a lower Cu on carrier proportion gives better surface exposure and helps in temperature control. Thus, 2 to 20% Cu on carrier is preferred even if it means more solids circulation and use of larger treating vessels.

Most of the reducing gases to be treated contain little $H_2S$, e.g. 1 to 2% which is a help in temperature control. Assuming a gas contains 5% $H_2S$, which is relatively high, this gas may be fed preheated to only 130° C. below the desulfurization temperature into treating zone and this sensible heat is enough to keep the unit in heat balance.

Thus, it was determined that the copper-solids were very effective in removing hydrogen sulfide at high temperatures in the presence of a high concentration of hydrogen and even with the high proportion of the copper present as $Cu_2S$. The sulfided copper can be removed continuously and at constant rate from the treating zone to be regenerated.

The regeneration of the sulfided copper is accomplished without the need of reducing gas but by using a controlled amount of free oxygen in the regenerating gas, as explained, at temperatures similar to those used in the treating zone, i.e., in the range of 450° to 900° C. and preferably 500° to 750° C.

Regeneration involves a heat control problem. Here is where a low amount of Cu on carrier helps. The sulfided Cu on carrier powder made to flow from the desulfurizer can be brought to the regeneration temperature and heat of regeneration supplied by being contacted with hot $Cu_2O$ entering the regeneration zone to maintain heat balance.

To assure that copper oxides do not remain in the copper-solids passed from the regeneration zone to the sulfur removal zone, some cuprous sulfide is allowed to remain in the regenerated copper-solids returned to the desulfurizing zone. Copper oxides in the copper-solids are very active oxidizing agents which react with $H_2$ and CO to cause formation of water and $CO_2$, undesired in the desulfurizing and in the treated gaseous product. Therefore, precautions are taken to make the presence of the copper oxides in the desulfurizing zone negligible.

The following examples illustrate different methods of regeneration.

*Example II*

Using the technique which depends on oxidation of $Cu_2S$ by $O_2$-containing gas in the spent solids (Cu and $Cu_2S$) from the desulfurizer where $H_2S$ in a reducing gas is reacted to form $H_2$, these spent solids are introduced into a bed of solids fluidized with air acting as fluidizing gas and supplying oxygen to the fluidized solids bed at 400 to 700° C. The air rate is controlled to nearly enough oxygen for converting the $Cu_2S$ to Cu by the reaction:

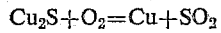
$$Cu_2S + O_2 = Cu + SO_2$$

Accompanying said reaction, a small amount of $Cu_2O$ is formed even with vacuum applied for removal of the gas products which are predominately $N_2$ and $SO_2$. The solids bed kept homogeneously mixed is then held at a fixed solids composition of mainly Cu with a relatively smaller amount of $Cu_2S$ and still smaller amount of $Cu_2O$ by continuously adding more Cu and $Cu_2S$ and continuously removing solids that are mainly Cu. The solids continuously removed from the bed are continuously removed to a soaking zone for final reaction of the $Cu_2O$ with the residual $Cu_2S$ in excess of 1 mol per 2 mols of $Cu_2O$ at a temperature in the range of 450° to 740° C. so that the resulting solids removed from the soaking zone are practically free of $Cu_2O$. With no air, oxygen, or other gas entering the soaking zone, $SO_2$ gas evolved is drawn off through a pump. The thus regenerated solids present in the soaking zone and withdrawn therefrom will then contain at least 9 parts Cu to 1 $Cu_2S$ and no appreciable amount of $Cu_2O$ or CuO.

The method described in this Example II has certain advantageous features of being self-correcting with respect to elemination of copper oxides from the solids, if the oxidation by the $O_2$-containing gas is controlled carefully. If too much $Cu_2O$ is formed in the bed contacted by air, some of the $Cu_2S$-containing spent solids can be supplied to the soaking zone.

*Example III*

Using the technique which uses $Cu_2O$ from a Cu oxidizing zone to react with the $Cu_2S$ of the spent treating solids, the $Cu_2O$ is supplied at a rate of a little less than 2 mols per mol of $Cu_2S$. From the resulting solids mixture, $SO_2$ is evolved and evacuated without addition of air, $O_2$, or $N_2$. The solids are kept well stirred and at a temperature of 450° to about 740° C. While the evolution of $SO_2$ is proceeding, the solids mixture contains copper mostly as Cu with much lesser amounts of $Cu_2S$ and very little $Cu_2O$. Practically complete removal of the little remaining $Cu_2O$ is obtained by a final soaking, and then the solids which contain principally Cu with a small amount of $Cu_2S$ are ready for recycling to the zone where a fuel gas or reducing gas containing $H_2S$ is treated.

Using the operation of Example III, $O_2$ gas is not present to interfere with the reaction of $Cu_2S$ with $Cu_2O$, and the $SO_2$ escapes with high purity. There is less chance for the $SO_2$ to be oxidized to $SO_3$ in the zone kept free of $O_2$ gas and containing a high proportion of Cu solids. The $SO_2$ gas evolved is of high purity insofar as no other gas is introduced into the zone. Some of the $SO_2$ gas can be recycled to the zone for fluidizing the solids where $Cu_2S$ is reacted with $Cu_2O$ in the absence of $O_2$ or air.

The high effectiveness of the copper-solids for removing $H_2S$ rapidly at high temperatures makes its use particularly advantageous in removing $H_2S$ from high-temperature gaseous products obtained in cracking natural gas, petroleum oils, or petroleum residuum with a fluid coking process at temperatures in the range of 500° to 700° C. The gaseous products from the cracking at high temperatures can be thus desulfurized without much lowering of their temperature and without oxidation of the components in the gaseous stream treated under atmospheric or superatmospheric pressures.

It is contemplated that the copper in the copper-solids may be modified in its properties by the presence of small amounts of other metals, e.g., nickel, lead, or iron; however, the amount of metallic copper brought into contact with the gaseous stream containing $H_2S$ should be sufficient to combine with the sulfur which is to be removed and preferably be in excess thereof in the sulfided solids removed from the treating zone.

Another factor in favor of the use of the copper-solids for desulfurizing $H_2S$ contaminated gaseous hydrocarbon streams at high temperatures is that the copper removes the $H_2S$ sulfur at a rapid rate, permitting a high space velocity, and does not cause, under these conditions, an undesired cracking leading to deposition of carbon. Deposition of carbon on the solids adversely affects the efficiency of desulfurization, control of the regeneration, and recovery of $SO_2$.

In the foregoing respects, the high-temperature removal of $H_2S$ by the copper-solids is particularly useful and interesting. The treatment is adapted for removal of $H_2S$ from natural gas, from coke oven gas, from cracked natural gas, cracked petroleum oil vapors, and from volatile hydrocarbon products made by coking of sulfur-containing petroleum pitch. Space velocities in the desulfurizing may be in the range of 100 to 5,000 or more cubic feet of gas treated per cubic foot of copper-solids per hour depending on the temperature, sulfur removed, copper content of the solids, and concentration of solids in the bed. The numerical space velocities stated are based on the removal of sulfur equivalent to 1% $H_2S$ at an average temperature in the range of 300° C. to 600° C. with an average amount of 10 to 15% Cu on carrier.

The desulfurization temperature to be used depends on the amount of sulfur that can be tolerated in the treated gases and the nature of the gas treated. If gas rich in hydrogen is to be highly purified to avoid catalyst poisoning, the amount of $H_2S$ having to be made less than 0.001%, it has been shown that this is accomplished at low feed rates at low temperatures, e.g., about 300° to 350° C. On the other hand, if as much as 0.1% $H_2S$ can be tolerated in the treated gas, the gas can be treated at temperatures of 500° to 900° C. In general, the elimination of $H_2S$ was found to be constantly near equilibrium when the Cu in the copper bearing solids fluidized in the treating zone was prevented from being more than 65% sulfided at treating temperatures in the range of 350° to 600° C. Preferably the fluidized solids should contain a major proportion of the copper uncombined continuously for the continuous treatment at constant rates of flow for uniform removal of sulfur.

What is claimed is:

1. A process for reacting hydrogen sulfide present in a stream of fuel and reducing gas with Cu in fluidizable solids which comprises contacting said stream of gas in a treating zone with said solids containing copper as Cu and partly as $Cu_2S$ at an elevated temperature of from about 300° C. to 1000° C. which makes the hydrogen sulfide decompose into $H_2$ and form $Cu_2S$ in said solids, withdrawing said solids as the Cu in said solids becomes partially sulfided to $Cu_2S$ from said treating zone to a regenerating zone, intimately mixing solids withdrawn from the treating zone in the regenerating zone with an amount of solids containing $Cu_2O$ at an elevated temperature of from about 450° C. to 900° C. for converting the $Cu_2O$ by reaction with the $Cu_2S$ to form Cu and evolved $SO_2$ while leaving some of the $Cu_2S$ unreacted, soaking in a soaking zone the resulting solids containing copper mostly as Cu and partly as $Cu_2S$ and partly as copper oxides at elevated temperature to remove $SO_2$ and eliminate copper oxides therefrom and give the solids an increased Cu content, returning thus regenerated solids of increased Cu content from the soaking zone to the treating zone for replacement of the solids withdrawn, and withdrawing evolved $SO_2$ from the regenerating zone and from the soaking zone.

2. In a process as defined by claim 1, the elevated temperature in the treating zone being in the range of about 350° to 600° C., and the elevated temperature in the regenerating zone and in the soaking zone being in the range of about 450° to 750° C.

3. In a process as defined by claim 1, said solids containing $Cu_2O$ are formed by oxidizing Cu in solids containing $Cu_2O$ but free of $Cu_2S$ with oxygen of air in an oxidizing zone and nitrogen gas kept practically free of sulfur contaminants being removed from said oxidizing zone.

4. A process for removing sulfur from an $H_2S$ contaminated gas stream containing $H_2$ and hydrocarbon which comprises fluidizing fluidizable solids containing Cu and $Cu_2S$ under conditions to form $Cu_2S$ and $H_2$ by reaction of the Cu with the $H_2S$ in the gas stream, in a desulfurizing zone, withdrawing the gas stream desulfurized from said zone, continuously removing solids from said zone to a Cu regenerating zone where excess $Cu_2S$ of the solids is reacted with $Cu_2O$ in admixed fluidizable solids to convert the $Cu_2O$ to Cu and to evolve $SO_2$ and continuously removing regenerated solids from a fluidized mixture of regenerated solids containing principally Cu, and $Cu_2S$ with a minimum of $Cu_2O$, and continuously supplying said removed regenerated solids to the desulfurizing zone to maintain the Cu and $Cu_2S$ composition therein constant for a constant rate of sulfur removal from the gas stream in the desulfurizing zone.

5. A process for removing sulfur from a hydrogen sulfide-contaminated gaseous stream of reducing compounds including hydrogen, which comprises contacting the gaseous stream with regenerated fluidized solids containing copper principally as Cu and as $Cu_2S$ under conditions to make the Cu become partially sulfided to $Cu_2S$ by the hydrogen sulfide in a treating zone, removing the gaseous stream of reducing compounds unoxidized and desulfurized from the treating zone, removing said solids containing the copper partially sulfided to a regenerating zone where $Cu_2O$-containing solids are intimately admixed in a proportion to become converted to Cu with formation of $SO_2$ by reaction of the $Cu_2O$ with $Cu_2S$ in the solids from the treating zone, evacuating $SO_2$ gas from the regenerating zone and supplying regenerated solids containing copper principally as Cu with a minor amount of $Cu_2S$ from the regeneration zone to the treating zone.

6. In removing $H_2S$ from a reducing gas containing $H_2$ by contact in a treating zone with a regenerated fluidized solids containing $Cu_2S$ and Cu under conditions to partly sulfide the Cu by reaction of the $H_2S$, therewith, the improvement which comprises continuously removing said solids containing $Cu_2S$ and unreacted Cu to an $SO_2$ evolving zone where the $Cu_2S$ is reacted with intimately admixed $Cu_2O$-containing solids to make the resulting solids mixture contain mostly Cu, soaking a portion of said solids mixture with additional admixed $Cu_2O$-containing solids in a soaking zone where residual $Cu_2S$ is converted to Cu in said solids, transferring solids containing Cu and $Cu_2O$ practically free of $Cu_2S$ from said soaking zone to an oxidizing zone where they are fluidized with air under conditions to convert the Cu to $Cu_2O$ by $O_2$ of the air, withdrawing $N_2$ gas from the oxidizing zone, and supplying resulting solids from the oxidizing zone as the admixed $Cu_2O$-containing solids in the $SO_2$ evolving zone and the soaking zone.

7. In the process of claim 5 the step comprising transferring a portion of the solids containing mostly Cu with some unreacted $Cu_2S$ and $Cu_2O$ from said $SO_2$ evolving zone to another soaking zone where the $Cu_2O$ is reacted with excess $Cu_2S$ in said solids to free the solids of $Cu_2O$ before they are sent to the treating zone for use as said regenerated fluidized solids removing $H_2S$ from the reducing gas.

References Cited in the file of this patent

UNITED STATES PATENTS 2,747,968     Pigache _____ May 29, 1956